United States Patent
Bradley et al.

[11] Patent Number: 5,915,056
[45] Date of Patent: Jun. 22, 1999

[54] OPTICAL FIBER STRAIN RELIEF DEVICE

[75] Inventors: Kelvin B. Bradley, Norcross; Daniel Lee Stephenson, Lilburn, both of Ga.

[73] Assignee: Lucent Technologies Inc., Murray Hill, N.J.

[21] Appl. No.: 08/908,136

[22] Filed: Aug. 6, 1997

[51] Int. Cl.[6] .................................................. G02B 6/36
[52] U.S. Cl. .............................................. 385/76; 385/77
[58] Field of Search ............................ 385/76, 77, 78, 385/84, 55, 56, 58, 59, 60, 66, 68

[56] References Cited

U.S. PATENT DOCUMENTS

| | | | |
|---|---|---|---|
| 4,787,706 | 11/1988 | Cannon, Jr. et al. ............... | 350/96.24 |
| 4,801,764 | 1/1989 | Ohlhaber .............................. | 174/70 C |
| 4,812,009 | 3/1989 | Carlisle et al. ..................... | 350/96.21 |
| 5,073,044 | 12/1991 | Egner et al. ........................ | 385/86 |
| 5,151,962 | 9/1992 | Walker et al. ...................... | 385/86 |
| 5,181,267 | 1/1993 | Gerace et al. ...................... | 385/86 |
| 5,212,752 | 5/1993 | Stephenson et al. ............... | 385/78 |
| 5,261,019 | 11/1993 | Beard et al. ....................... | 385/60 |
| 5,461,690 | 10/1995 | Lampert .............................. | 385/100 |
| 5,530,787 | 6/1996 | Arnett ................................. | 385/137 |
| 5,638,474 | 6/1997 | Lampert et al. ................... | 385/78 |
| 5,748,819 | 5/1998 | Szentesi et al. ................... | 385/60 |

*Primary Examiner*—Hung N. Ngo

[57] ABSTRACT

A strain relief boot for attachment to an optical fiber or fiber containing cable has a mounting section and a tapered section extending therefrom with a smooth bore extending to the exit end of the tapered section. The exit or distal end of the tapered section has formed therein a curved funnel shaped portion, the curve of which is faired into the bore. The radius of curvature of the funnel is greater than the critical bend radius of the fiber or fiber cable and protects the fiber or cable exiting the boot from bending too sharply. The tapered section has a plurality of transverse slots which increase flexibility of the tapered section, but which limit the bend radius thereof under side loading to a value greater than the critical bend radius of the fiber or fiber cable. The mounting section is formed with a ridge or ridges for effectively attaching the boot to a connector.

14 Claims, 5 Drawing Sheets

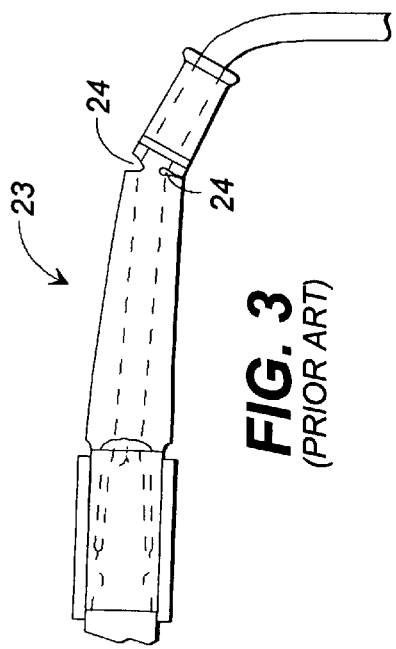
FIG. 3 *(PRIOR ART)*
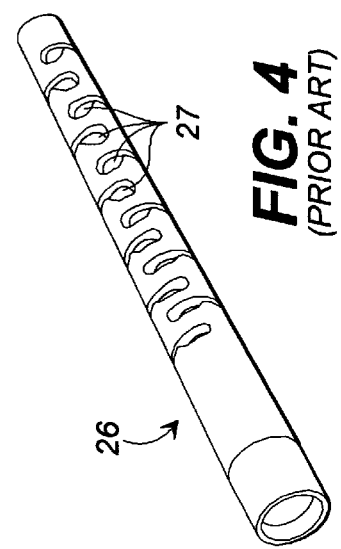
FIG. 4 *(PRIOR ART)*
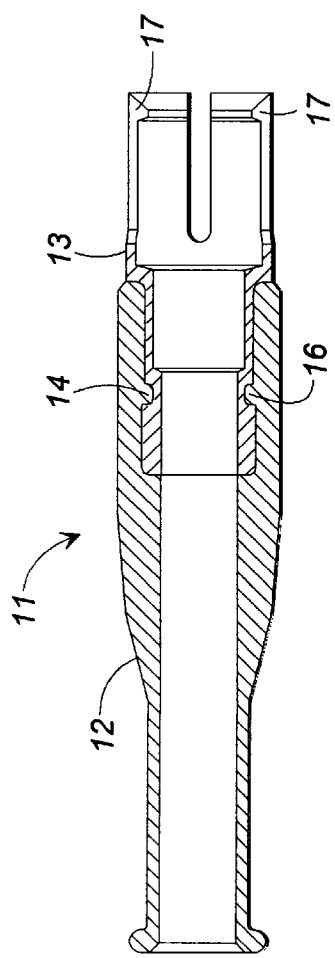
FIG. 1 *(PRIOR ART)*
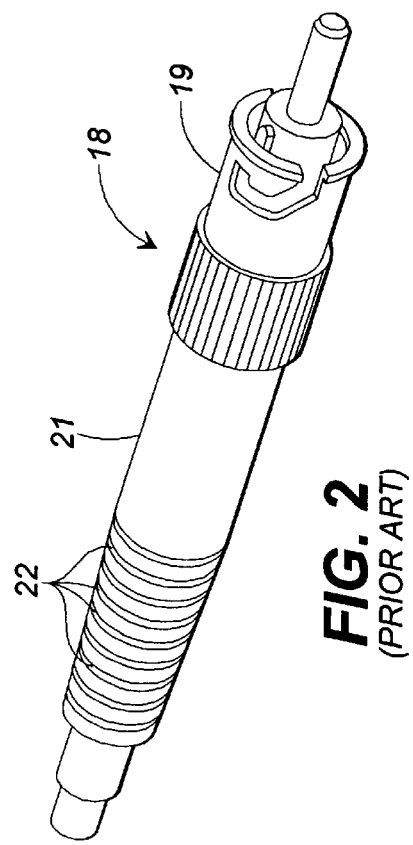
FIG. 2 *(PRIOR ART)*

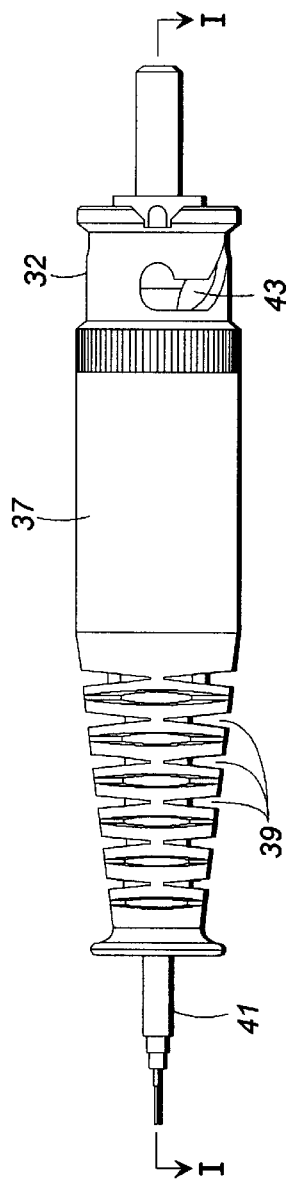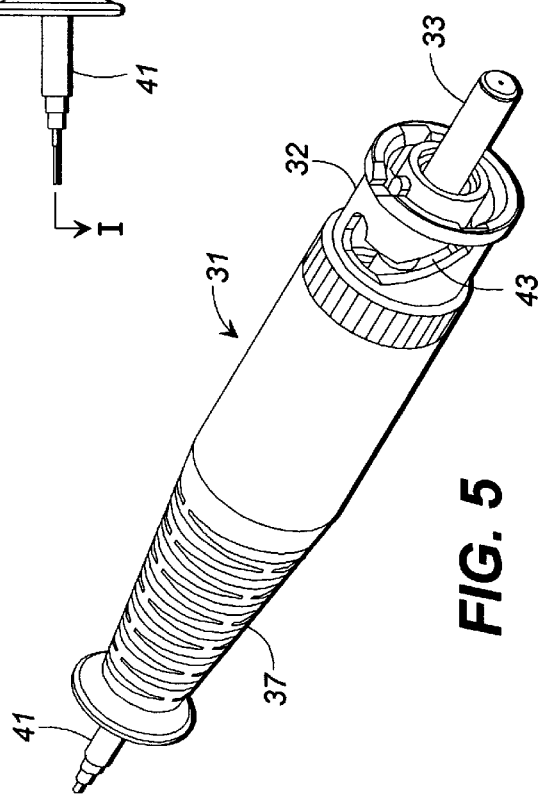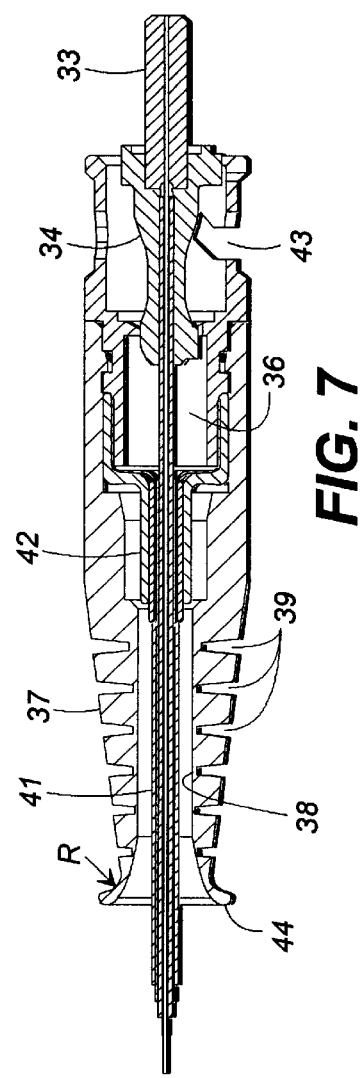

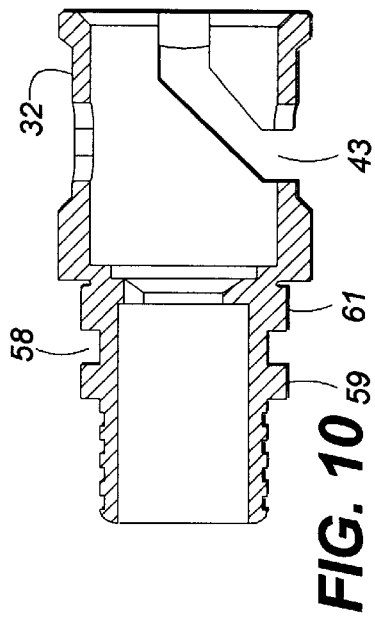
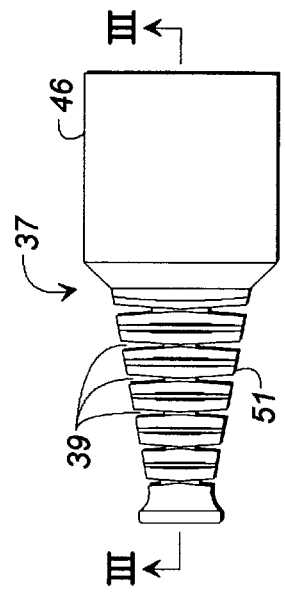
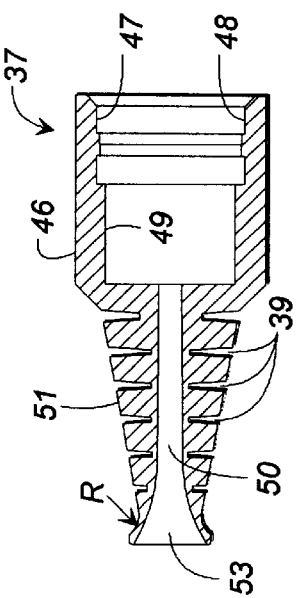
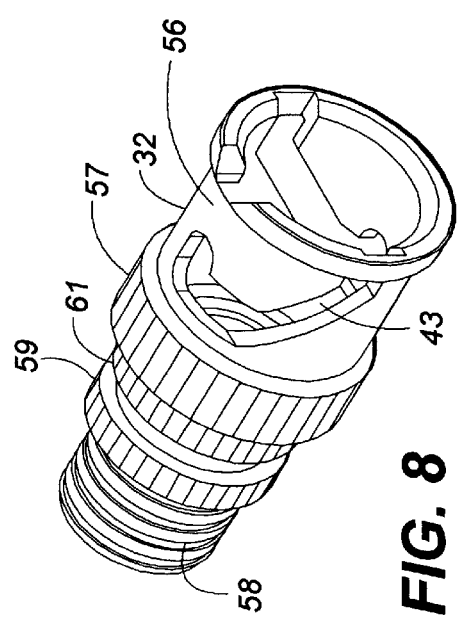
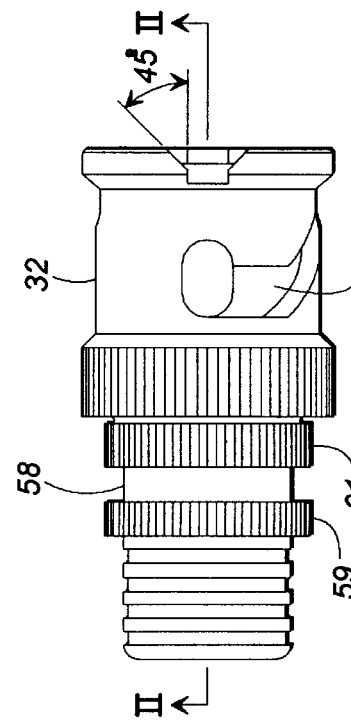

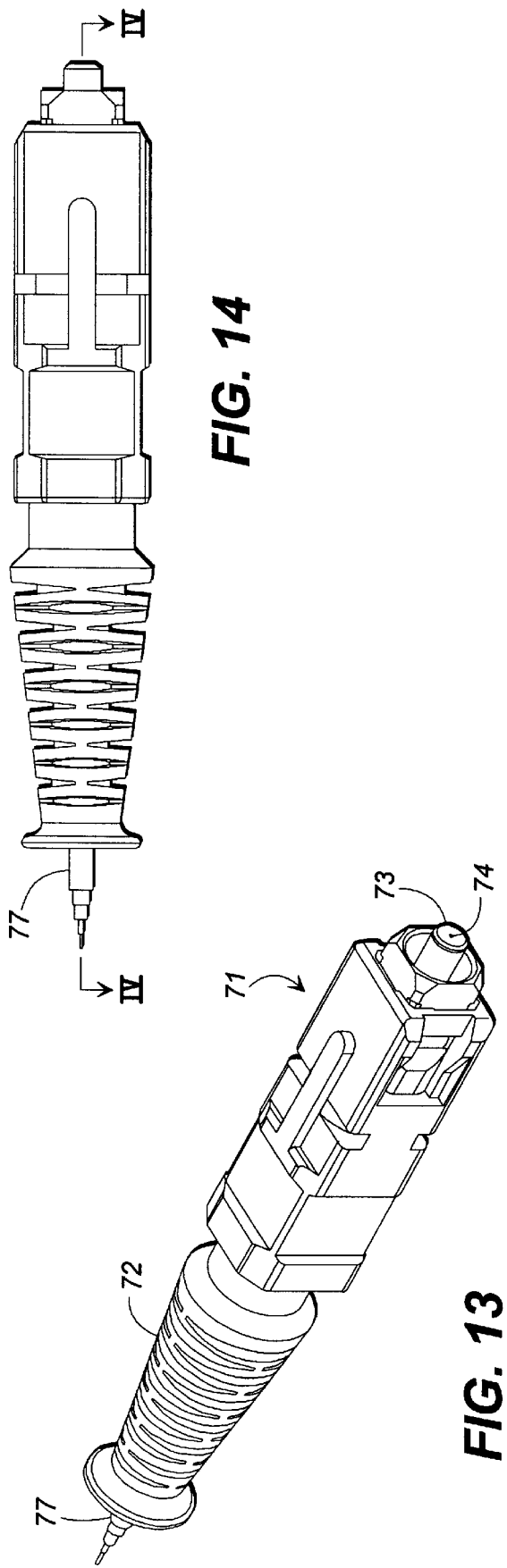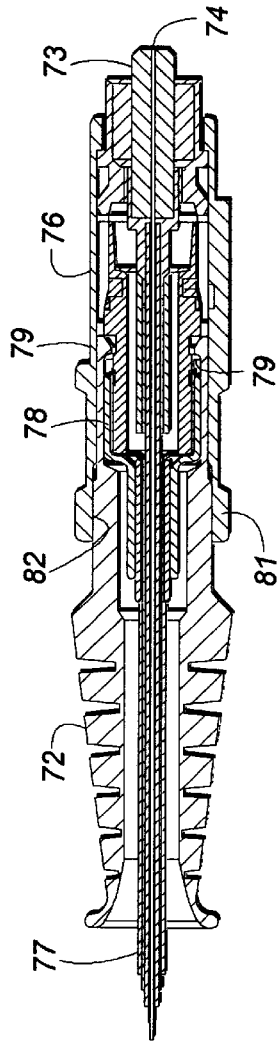

OPTICAL FIBER STRAIN RELIEF DEVICE

FIELD OF THE INVENTION

This invention relates to a strain relief member for use with optical fiber connectors or other fiber bearing components.

BACKGROUND OF THE INVENTION

Present day communications technology is directed more and more to the use of optical fibers for signal transmission. Optical fibers have the undisputed advantage over wire or metallic transmission media of a far greater signal bandwidth transmission capability, but they have the physical disadvantage of being far more fragile than metallic wire. Thus, the handling and routing of optical fibers, whether singly or in ribbons and/or cables not only demands extreme care in handling, but, also, extra measures of protection for the fibers. In routing either cables or single fibers, it is imperative, for reliable signal transmission, that sharp bends in the fibers be avoided. Inasmuch as the laws of optics apply to such transmission, a too sharp bend in the fiber can and does results in signal loss by virtue of at least some of the transmitted light leaking out of the fiber at the bend. A too sharp, i.e., small radius, bend can also cause at least some further signal degradation if the bend introduces microcracks in the fiber, which reduce or impair the uninterrupted guiding of the optical signals. The small bend radiuses can also cause fiber breakage. Most optical fiber being made today is capable of resisting formation of such microcracks or breakage, but when the fiber is subjected to recurring external forces, the tendency toward cracking and/or breakage increases.

In most environments where optical fiber cables terminate in, for example, an office building or in other user premises, the individual fibers are separated out of the cable and directed, by means of connectors and patch panels, to the particular user or to the particular signal receiving and/or transmitting equipment. Thus, in a typical patch panel arrangement, the fibers are separated on one side of the multi-apertured panel, and connectors are affixed to the ends of the fibers. The connectors typically are inserted into couplers mounted in the panel into which connectors or individual fibers are inserted from the rear side of the panel. Typical of such arrangements is that shown in U.S. Pat. No. 5,274,729 of King et al., for optical fiber connections. It can be appreciated that the cable leading up to the front of the panel affords protection from sharp bends for the individual fibers and only short lengths of unprotected fibers that are necessary to reach the different couplers are exposed. Thus, there is little likelihood that the fibers may be kinked or bent too sharply. On the other hand, however, the individual fibers leading away from, or up to, the rear of the panel are essentially unprotected. If these latter fibers are allowed to hang loosely from the rear of the panel, they are in danger of becoming bent, twisted, kinked, or otherwise stressed, with a consequent degradation of signal transmission, especially when an installer, for example, is working at the rear of the panel and making numerous connections and disconnections. In addition, there are numerous instances where fiber connectors, such as the SC type connector, are used in the field without benefit of, for example, a patch panel. Regardless of the milieu in which the connector is to be used, it is most desirable that some form of protection from the stresses be afforded the fiber.

The prior art is replete with arrangements for relieving, or protecting, the fiber from, stresses which night impair signal transmission. Thus, in U.S. Pat. No. 5,181,267 of Gerace et al. there is shown an optical fiber connector which has an elongated, exteriorly tapered strain relief boot extending from the rear of the connector and through which the cable passes. The boot slips over the rear end portion, i.e., the sleeve, of the connector, and protects the cable from excessive bending at the region where it enters the connector. Such a bolt arrangement, under heavy side loading, can be bent excessively, hence, it does not fully protect the fiber cable from such bending. In addition, the exit end, i.e., the end remote from the connector, does not prevent excessive bending of the cable. The boot of the Gerace et al. patent is typical of prior art boots in having a tapered outer diameter and a plurality of bend-limiting segments separated from each other by gaps of a width approximately equal to the width of each segment. When the cable is bent, the segment portions on the inside of the bend are forced toward each other until they touch, thereby preventing further bending. Properly designed, the boot prevents the cable from approaching the critical bend radius for the fiber or fibers therein.

Such bend limiting boots, where overall size and length are not constraints, can be capable of handling a wide range of loads or stresses. However, as a practical matter, the diameter of the boot should approximate that of the connector where they join, and that of the cable at the distal or remote end, and the length should be reasonably short because of space limitations and the like.

In U.S. Pat. No. 5,461,690 of Lampert, there is shown a bend limiting boot which, although complying with practical dimensional restraints, is still capable of providing a large measure of protection to the cable and fiber against side stress loads. The boot attaches, at one end, to the connector and has an outside diameter comparable in size to the connector, and has an axial bore for holding an optical fiber or cable. The boot is made of a material that is sufficiently flexible to permit bending, but sufficiently stiff to accommodate side loads. Transverse grooves are provided in the back half of the boot to accommodate light side loads while effectively limiting the bend radius of the fiber contained therein. The exit end of the boot, however, does not prevent sharp bends, i.e., bends of a radius less than the critical bend radius of the fiber, and the boot itself must, for proper operation, be fairly long.

Another type of prior art strain relief boot is shown in U.S. Pat. No. 5,261,019 of Beard et al. That boot is an elongated, tapered number attached to the rear of the connector, and having a plurality of transverse grooves to limit bending. This structure is similar to a large number of boots commonly in use. As is the case with the Lampert strain relief boot, there is no protection against fiber bending at the exit end of the boot, and the boot itself is quite long.

The Gerace et al. boot, discussed hereinbefore, is objectionable for the same reasons as the foregoing boots.

There are numerous other examples of strain relief boots, in one form or another, as shown in U.S. Pat. Nos. 4,812,009 of Carlisle et al., 5,073,044 of Egner et al., 5,151,962 of Walkes et al., and 5,212,752 of Stephenson et al. Seemingly all of the prior art strain relief boots are deficient in one or more of the following. In virtually all cases, the boots are too long, and project away from the patch panel, for example, a distance that interferes, for example, with the closing of the panel door which can cause acute bending of the fibers. Most of the boots are custom designed to fit one particular connector, and many of them are made of flammable material, such as PVC, which introduces and added drawback when used in customer premises.

There have been various approaches to alleviating or eliminating some, if not all, of the foregoing drawbacks. Thus, in U.S. Pat. No. 5,530,787 of Arnett, there is shown a curved fiber guide for supporting and protecting optical fibers extending away from the connector. The guide, which is made of a fairly stiff plastic material has, at one end, a mounting member for mounting the guide to any one of a number of different fiber bearing components, and its curvature is such that the fiber is prevented from kinking or being curved to a radius less than the critical radius of curvature. Such a guide solves many of the foregoing problems, but is only usable where there is ample space or room, inasmuch as it extends a considerable distance from the connector end from which the fiber is emergent.

SUMMARY OF THE INVENTION

The present invention is a strain relief device or boot for attachment to an optical fiber or cable connector. The device, preferably made of a polypropylene compound having flame and fungus resistance, has a generally tapered cylindrical shape having a bore extending along its central axis for containing and enclosing an optical fiber, a buffered optical fiber, or a buffered fiber having an outer jacket. The front or proximal end of the device, or boot, has an outside diameter which is comparable in size to the connector to which it is to be attached, whereas the distal end of the boot is comparable in size to the buffered or jacketed optical fiber.

The boot of the invention is made from a flexible polypropylene material that is, nonetheless, sufficiently stiff to accommodate heavy side loading without damage to the fiber, and it has a plurality of spaced transverse grooves that extend circumferentially at least part way around the boot to accommodate light side loading. The grooves also function to limit the bending radius of the boot to a value greater than the critical bend radius for the fiber. The grooves are not cut deeply enough to reach the inner bore of the boot, hence, the interior wall of the bore is smooth and uninterrupted, greatly simplifying threading the fiber through the bore. The outer surface of the boot is tapered from a size comparable to the size of a connector at the proximal end to a size comparable to the size of the fiber at the distal end. The grooves are formed such that the resistance to side loading is also tapered from a high resistance or stiffness at the proximal end to a low resistance, i.e., high flexibility at the distal end.

In accordance with one feature of the invention, the boot has, at its distal end, an exit funnel having a bend radius that is large enough to ensure that the contained fiber will not experience bending loss of the development of microcracks. Thus, the funnel radius is greater than the critical bend radius of the fiber, which suffers bending loss and development of microcracks if the critical radius is not exceeded. The stiffness of the boot increases from the distal, or funnel end, to the proximal, or connector end.

In a first illustrative embodiment of the invention, the boot embodying the principles of the invention is designed for use with either an ST or an FC type of connector, and is adapted to slip over and embrace the cable retention member or cap of the coupler. In the prior art, the strain relief boot is held in place on the cap by means of cement, which is messy to use, but makes it difficult to remove the boot from the cap. In order to avoid the use of cement, the cap may be modified to have a serrated surface over which the enlarged portion of the boot of the invention fits and grips firmly. The boot itself is, because of the unique funnel configuration, considerably shorter than boots currently in commercial use with the ST and FC connectors.

In another embodiment of the invention, the boot embodying the principles of the invention is adapted for use with SC and LC type connectors. The inner bore of the boot, at the proximal end thereof, has projections thereon for mating with a groove in the cable retention member of the standard SC connector. The connector, and, more particularly, the cable retention member, does not have to be modified to accommodate the boot, the boot being retained thereon in the same way as prior art boots for the SC connector.

The principles and features of the present invention will be more readily apparent from the following detailed description, read in conjunction with the accompanying drawings.

DESCRIPTION OF THE DRAWINGS

FIGS. 1 through 4 are views of several strain relief boots as used in the prior art;

FIG. 5 is a perspective view of an ST type of connector having the strain relief boot of the invention mounted thereon;

FIG. 6 is a side view of the connector of FIG. 5;

FIG. 7 is a cross section of the connector of FIG. 6 taken along the line I—I thereof;

FIG. 8 is a perspective view of a modified cable retention member or cap for the ST connector of FIGS. 5, 6, and 7;

FIG. 9 is a side view of the cap of FIG. 8;

FIG. 10 is a cross-section of the cap of FIG. 9 along the line II—II thereof;

FIG. 11 is a side view of the boot of the invention for use with the connector of FIGS. 5, 6 and 7;

FIG. 12 is a cross-section of the boot of FIG. 11 along the line III—III thereof;

FIG. 13 is a perspective view of an SC connector with the strain relief boot of the invention mounted thereon;

FIG. 14 is a side view of the connector of FIG. 13;

FIG. 15 is a cross-section of the connector of FIG. 14 along the line IV–IV thereof;

DETAILED DESCRIPTION

Figure 19:
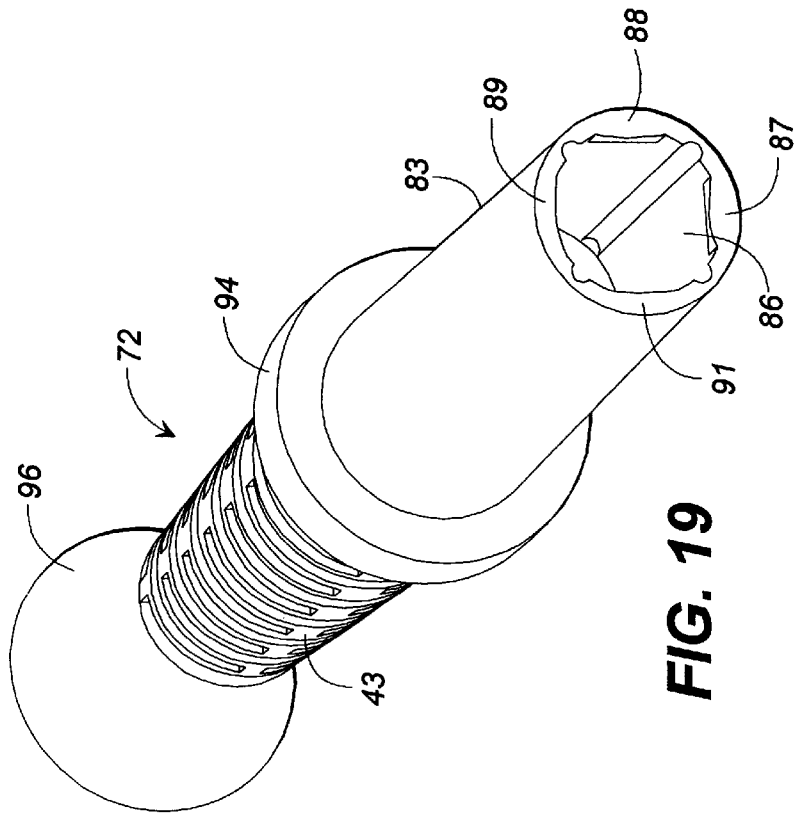
FIG. 19 is a perspective view of the boot of FIG. 16.
Figure 16:
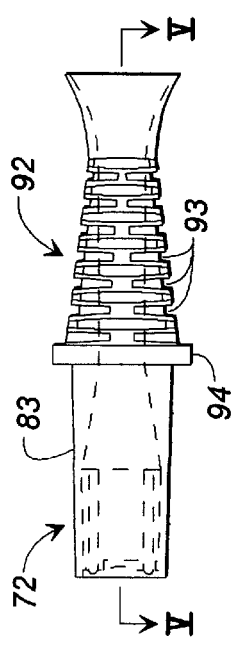
FIG. 16 is a side view of the strain relief boot of the invention for use with the connector of FIGS. 13, 14, and 15.
Figure 17:
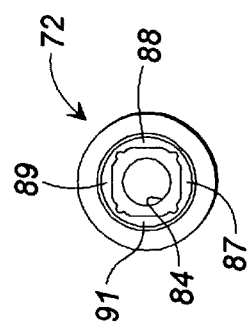
FIG. 17 is an end view of the boot of FIG. 16.

FIG. 1 is a cross-section view of a strain relief boot for use with an SC type connector, as shown in U.S. Pat. No. 5,212,752 of Stephenson et al. The boot 11 comprises first and second members 12 and 13, with member 13 being inserted into member 12 and held in place by means of a projecting ridge 14 on the interior of member 12 fitting into a groove 16 in member 13. The proximal end of member 13 has projections 17 thereon which snap over a shoulder on the cable retention member of the connector to hold the boot in place on the connector. It can be seen that the two part structure results in a strain relief boot of unusual, and undesirable length. Further, the distal or exit end of the boot does not protect the fiber from too sharp bends.

FIG. 2 is a perspective view of an ST type connector 18 in which the cap or cable retention member 19 has a strain relief boot 21 affixed thereto, as shown in U.S. Pat. No. 5,261,019 of Beard et al. Usually, to prevent rotation of the boot relative to the cap, the boot is cemented in place on the rear of the cap. The boot has a plurality of transverse cuts or grooves 22 which, as discussed before, facilitate light load bending of the boot, but limit heavy load bending. As was the case with the boot of FIG. 1, there is no bend protection for the fiber emerging from the distal end of the boot 21, and, in addition, the boot 21 is quite long.

FIG. 3 is a bending limiting boot 23 for use on an LC connector as shown in U.S. Pat. No. 5,461,690 of Lampert, which is made of a flexible material of sufficient stiffness to resist heavy side loading. A number of grooves 24, which extend into the interior bore and are located exclusively on the back half of the boot, function to limit the total bending radius to greater than the critical bend radius. There is no protection against too sharp bending of the fiber at the exit or distal end of the boot.

FIG. 4 is the boot of Gerace et al. U.S. Pat. No. 5,181,267 which has been discussed in the foregoing. The grooves 27 extend through the wall into the bore, there is no fiber protection at the distal or exit end, and the boot itself is quite long.

In FIG. 5 there is shown a perspective view of an ST type of connector 31 having mounted thereon a strain relief boot 37 in accordance with the present invention, and FIGS. 6 through 12 are related views thereof illustrating details of the invention. The connector 31 comprises a cap or cable retention member 32, sometimes referred to as a nut coupling, and a fiber containing ferrule 33 extending from the connector end of connector 31. Ferrule 33 is contained in a ferrule barrel assembly 34 into which the coated fiber 36 is inserted. The rear portion of the cap 32 has mounted thereon the strain relief boot 37 of the invention having a bore 38 and which has a plurality of circumferential slots 39. As can best be seen in FIG. 7, the slots 39 do not extend into the bore 38, thereby insuring that the wall of bore 38 is smooth and uninterrupted, thereby facilitating insertion of the cable or buffered and/or insulated fiber 41 into the strain relief boot 37 and the cap 32, where it is held in place by crimp sleeve 42. A bayonet type locking slot 43 is provided in cap 32 for locking the connector 31 in place in whatever connection or adapter to which it is to be mounted. Further in accordance with the invention, at the distal or exit end 44 of boot 37, the bore 38 is funnel shaped, having a radius of curvature R that is greater than the critical bend radius of the fiber and that is faired smoothly into bore 38. This radius is preferably from approximately eight (8) millimeters to approximately twelve (12) millimeters, and can be faired into a slightly smaller radius at the outer edge of the funnel. The boot 37 of the invention has, as can best be seen in FIGS. 11 and 12, a first, straight, mounting section 46 having an outer diameter approximating in size the outer diameter of cap 52, and having a first enlarged bore 47 within which is formed a shoulder or annulus ridge 48, and a second, slightly smaller diameter bore 49. Extending from mounting section 46 is a tapered section 51 having transverse slots 39 formed therein which extend around the tapered section 51 and a central bore 50, as discussed hereinbefore, and an exit end or section 52 formed in an interior funnel shape having, a shown, a radius R which is faired smoothly into the bore 50. As discussed in the preceding, slots 39 do not extend into the bore 50, thereby leaving the interior wall of the bore smooth for easy and rapid insertion of a cable or fiber therethrough. As can be seen in FIG. 12, each slot extends into the tapered portion and distance less than the distance from the outer surface of the tapered section adjacent the slot to the interior wall of the bore 50. In the prior art combination of the cap and the boot, it is necessary, because of the bayonet lock on the cap, that it be rotated to lock in position. In general, the boot will not rotate with the cap, thereby causing a rotational movement between the cap and the boot, which is undesirable for a number of reasons. The prior art solution for preventing this relative rotational movement has been to cement the boot to the cap, which is a messy operation, especially when performed in the field. With the boot 37 of the invention, it is possible, by means of a slight modification of the cap 32, to eliminate the need for cementing the boot to the cap. In FIGS. 8, 9, and 10, the modified cap 32 is depicted. The cap 32 comprises a front, locking section 56 having an enlarged knurled ring 57 for facilitating turning of cap 32 to lock it into place. Extending from the rear of section 56 is a barrel member 58 having first and second spaced knurled ridges or shoulders 59 and 61. The boot mounting section 46 slips over the barrel member 58 and over the ridges 59 and 61, with the annular ride 48 falling into the space between rings 59 and 61. The diameter of bore 49 is such that the section 46 is press fitted over the ridges 59 and 61, and the boot 32 is prevented from turning independently by the knurls on the ridges. In addition, the ridge 48 prevents the boot from being pulled off of the barrel 58 under normally encountered tensile stresses.

Heretofore it has been the practice to make strain relief boots out of a material such as polyvinyl chloride (PVC), however, this and many similar materials have a high flammability characteristic. As a consequence, the boot 37 of the invention is made of polypropylene, which is much less flammable, and which, in the configuration of the boot shown in FIGS. 11 and 12, produces a graduated resistance to lateral stresses. Thus, the boot 37 is quite stiff in the mounting region 46 and hence, highly resistant to lateral stresses, and, in the tapered section 51, the resistance to such stresses gradually diminishes as the diameter of the boot decreases, to where the boot is quite flexible at the distal or exit end containing the funnel 53. As expanded hereinbefore, the slots 39 prevent to boot from being too sharply bent, and the funnel 53 insures that the fiber passing through the exit end likewise will not be too sharply bent. It can be seen that the boot 37 of FIG. 7 is somewhat longer than the boot 37 of FIGS. 11 and 12. The shorter boot of FIGS. 11 and 12 is made possible by the unique structure of the funnel and because of the material used, and is the preferred configuration.

A strain relief boot in accordance with the principles of the invention for use with the SC type of connector is shown in FIGS. 16, 17, 18, and 19. The connector 71, with the boot 72 attached thereto, is shown in FIGS. 13, 14, and 15, and comprise a ferrule 73 containing a fiber 74, the ferrule 73 being mounted in a cable retention member 76 with the fiber cable 77 being held therein by means of a crimp sleeve 78. The cable retention member 76 has formed thereon shoulders or ridges 79, and the assembly as thus far described is mounted in a plug frame 81 which has a rearwardly extending bore 82. Strain relief boot 72, which is best seen in FIGS. 16 through 19, has an elongated mounting portion 83 having an outer diameter dimensioned to fit tightly into bore 82. If desired, the outer diameter of portion 83 may be tapered slightly to facilitate insertion into bore 82. The boot 72 has a central bore 84 which extend completely therethrough for affording a passage for the cable or fiber into the connector 71. The front or proximal end of the boot portion 83 has a substantially square opening 86 leading into the substantially circular bore 84, as best seen in FIG. 19. As a consequence, four lips or ridges 87, 88, 89 and 91 are formed which engage with shoulders 79, 79 in the cable retention member 76 to lock boot 72 axially in place within connector 71.

Figure 18:
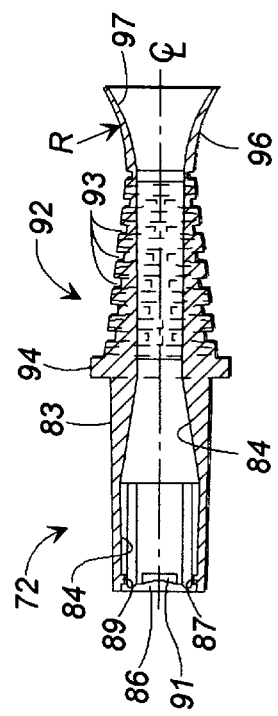
FIG. 18 is a cross-section of the boot of FIG. 16 along the line V—V thereof.

The rear portion 92 of boot 72 forms to strain relief portion thereof, and is externally tapered from an outer diameter approximately that of the connector to an outer diameter slightly larger than the diameter of the cable or coated and jacketed fiber 77. As is the case with the boot 37 of FIGS. 11 and 12, boot 72 is preferably made of polypropylene and the tapered section 92 has a plurality of transverse grooves 93 formed therein which, as best seen in FIG. 18, do not extend into, or communicate with, bore 84. Thus, the wall of bore 84 is smooth and uninterrupted, thereby facilitating insertion and withdrawal of fiber or fiber cable. The grooves 93 perform the previously discussed function of limiting the bending of boot 72, and especially of portion 92 so that the critical bend radius of the fiber is not reached. The portion 92 of boot 82 may be separated from portion 83 by a shoulder or ridge 94 which functions as a stop for preventing accidental over insertion of boot 72 into connector frame member 81.

The distal or exit end 96 of boot 72 is flared outward as shown, to produce a funnel shaped opening 97 which is curved, having a radius R which is greater than the critical bend radius of the fiber or cable. As a consequence, the fiber is further protected from too sharp bends. In practice, a value of R from approximately eight (8) millimeters to approximately twelve (12) millimeters has been found to afford the desired protection of the fiber under virtually all side loading conditions.

The strain relief boot of the invention, as illustrated in the foregoing embodiments has a number of advantages over prior art types of strain relief boots. First an foremost, the exist funnel provides a minimum bend radius that exceeds the critical bend radius, thus minimizing the chances of an accidental too sharp bending of the fiber. The smooth internal bore greatly facilitates fiber or cable insertion, and the boot of the invention can accommodate coated fiber, buffered fiber, or jacketed or tubed fiber without modification. Bending stresses are reduced by the use of a funnel attached to a thin wall tube with rib stops (grooves) that increases in stiffness toward the connector end of the boot, thus permitting the use of a shorter boot than is commonly used in the prior art. The boot can be readily snapped onto SC and LC and similar connectors without the use of tools, and can also be snapped onto ST and FC type connectors having modified cable retention members, without the use of epoxy cement or tools. Even where modification of the cable retention member is not feasible, for example, the boot of the invention affords all of the other aforementioned advantages.

In conclusion, it should be noted that it will be obvious to those skilled in the art that many variations and modifications may be made to the preferred embodiments without departure from the principles of the present invention. All such variations and modifications are intended to be included herein as being within the scope of the present invention as set forth in the following claims. Furthermore, in the claims hereinafter, the corresponding structures, materials, acts, and equivalents of all means or step plus function elements are intended to include any structure, material, or acts, for performing the functions with other elements as specifically claimed.

We claim:

1. An optical fiber strain relief boot for limiting the bending radius of a cable or fiber carried by a connector, said boot comprising:

an elongated member having a proximal end having means for mounting said boot to the connector, said elongated member having a smooth uninterrupted bore extending therethrough for carrying the cable or fiber exiting the connector;

said elongated member having a distal end remote from said proximal end; and means at said distal end for limiting the bending radius of fiber or cable exiting said distal end, said means comprising a funnel shaped region of said bore having a radius of curvature greater than the critical bend radius of the cable or fiber.

2. A strain relief boot as claimed in claim 1 wherein said radius of curvature is within the range of approximately eight millimeters to approximately twelve millimeters.

3. A strain relief boot as claimed in claim 1 wherein said radius is faired into said bore.

4. A strain relief boot as claimed in claim 1 wherein a portion of said boot adjacent the proximal end has as external configuration approximating in size the outer configuration of the connector, and a second, tapered portion tapering toward said distal end of said boot.

5. A strain relief boot as claimed in claim 4 wherein said tapered portion has a plurality of transverse slots formed therein and extending around said tapered portion.

6. A strain relief boot as claimed in claim 5 wherein each of said slots penetrates into said tapered portion a distance less than the distance from the outer surface of the tapered portion adjacent the slot to the interior wall of said bore.

7. A strain relief boot as claimed in claim 1 wherein said boot is made of a material that is resistant to flame and to fungus.

8. A strain relief boot as claimed in claim 7 wherein said material is a polypropylene compound.

9. A strain relief boot for use with an optical fiber connector wherein the connector has a ferrule for receiving a fiber and cable retention member having a rear portion extending rearwardly of the ferrule and at least one ridge extending about the rear portion; said strain relief boot comprising an elongated member having a mounting section having a proximal end, said mounting section having a first bore extending therethrough having a diameter sufficiently large to receive the rear portion of the cable retention member therein;

said elongated member further having a tapered section extending from said mounting section, said tapered section having a second bore extending therethrough and communicating with said first bore;

said tapered section having a distal end remote from said mounting section, said distal end having a funnel shaped opening formed therein and communicating with said second bore, said funnel shaped opening having a radius of internal curvature greater than the critical bend radius of the optical fiber; and means formed in said mounting section and extending inwardly of said first bore for engaging the ridge on the rear portion of the connector.

10. A strain relief boot as claimed in claim 9 wherein said radius of internal curvature is in a range from approximately eight millimeters to approximately twelve millimeters, and said funnel shaped opening is faired smoothly into said second bore.

11. A strain relief boot as claimed in claim 10 and further including a plurality of spaced transverse slots in said tapered section extending toward said second bore from the outer surface of said tapered section.

12. A strain relief boot as claimed in claim 11, wherein the distance each of said slots extends toward said second bore is less than the distance from the outer surface of said tapered section adjacent each of said slots to the inner wall of said second bore.

13. A strain relief boot as claimed in claim 9 wherein said means for engaging the ridge comprises a substantially square opening in the distal end of said mounting section communicating with said first bore and forming a plurality of ridges at said distal end for engaging the ridge on the rear portion of the connector.

14. A strain relief boot as claimed in claim 9 wherein said boot is made of polypropylene.

* * * * *